UNITED STATES PATENT OFFICE.

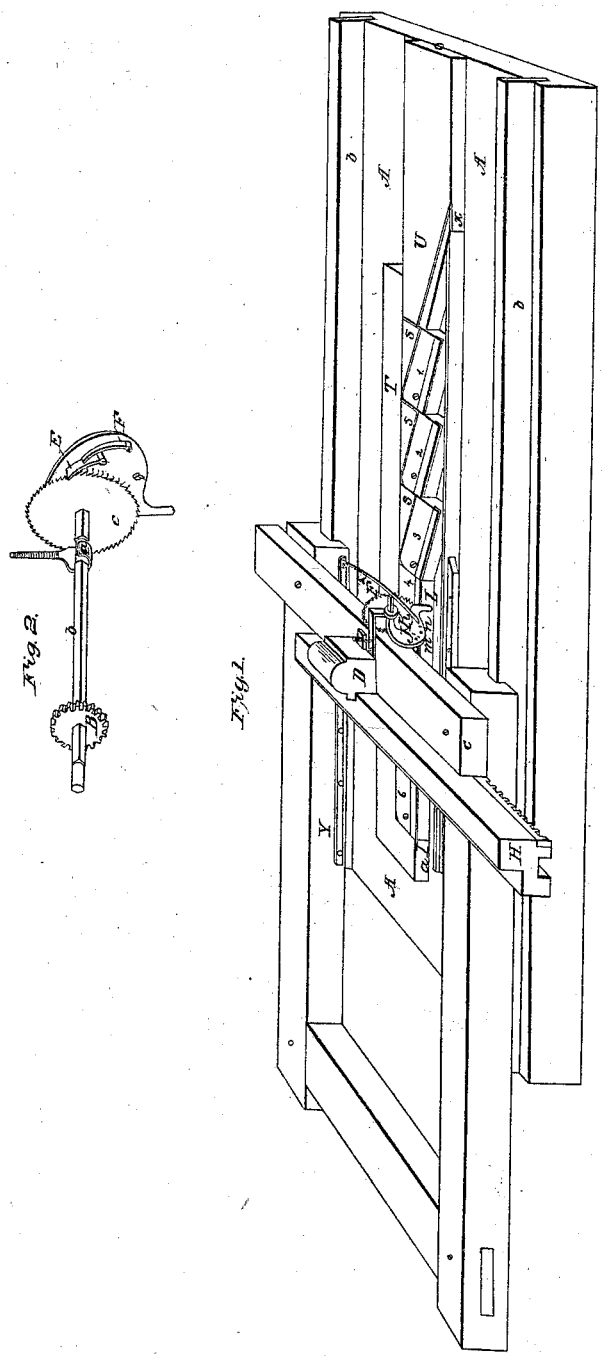

JOHN MILLER, OF LEXINGTON TOWNSHIP, STARK COUNTY, OHIO.

TAIL-BLOCK OF SAWMILLS.

Specification of Letters Patent No. 3,412, dated January 20, 1844.

*To all whom it may concern:*

Be it known that I, JOHN MILLER, of Lexington township, in the county of Stark and State of Ohio, have invented a new and useful Improvement on the Construction of Sawmills by the use of which the back part of the carriage is so shifted in returning from the saw as to place the log in a proper position to saw timber of any required thickness with accuracy; and I do hereby declare that the following is a full, clear, and exact description of the construction and operation of the same, reference being had to the annexed drawings, making a part of this specification, in which—

Figure 1, is a perspective view of a part of the floor, and of the carriage of a saw mill, with the improvements attached. Fig. 2, is a perspective view of the rag-wheel, or, ratchet, with its arbor or shaft and the small cog-wheel or pinion.

The improvement is applicable to sawmills in general use, and is constructed as follows: A, A, A, Fig. 1, represents the floor of a saw mill; $b, b,$ represent the way pieces, which are let into the sleepers in the ordinary manner, and the carriage also moves on them in the usual way; C, represents a piece of timber about four inches thick and about fourteen inches broad, and extending a little beyond the carriage beams on each side, it is screwed down on the carriage beams near the back end of the carriage; equally distant from the ends, and near the front edge of this piece of timber, is mortised in, a post D, Fig. 1, which is about seven inches square, and about six inches high, exclusive of the semicircular part on the top. The front side of the post is cut out from the lower end up, to within about two inches of the upper end, so that the upper end projects over the tail block to give it additional steadiness. On the rear of the post D, about one inch from the back edge of the piece of timber C, and midway between the carriage beams, is placed an iron hook, A, Fig. 2, so constructed, as to receive and hold the shaft $b$, Fig. 2, of the rag-wheel, at the underside of the piece of timber C. The other end of the hook, passes up through the piece of timber C, and is fastened by a screw nut, as represented at $e$, Fig. 1.

F, Fig. 1, and C, Fig. 2, is a rag wheel or ratchet, about eight inches in diameter, and one inch thick; the teeth are one quarter of an inch apart. The wheel is fastened to a shaft $b$, Fig. 2, which is about twenty two inches long, the shaft is supported, at the end near the rag wheel, or, ratchet by the hook A, Fig. 2, as already described; the other end of the shaft extends forward to the cross piece of the carriage and is there supported by, and works in a piece of iron, which is let into the cross piece, to enable the tail block to pass over it, and is screwed, or, spiked fast. On the shaft, near the gudgeon, is attached a small cog-wheel or pinion D, Fig. 2, which is one half the diameter of the rag-wheel; it works in the teeth of a straight iron bar, G, Fig. 1, which is fastened to the tail block H, as represented in Fig. 1.

I, Fig. 1, is a crooked lever, one end of which has a hole in it, which is passed over the rear end of the shaft of the rag-wheel, as represented at K, Fig. 1; the other end of the lever extends down nearly to the floor of the saw mill, and works along the edges of guide blocks and the spring as represented at L, Fig. 1. The middle of the lever is made broad and is curved to afford room for the hand, or, click E, Fig. 2, which is placed on the front side of the rag-wheel; the place where it is fastened is represented at $m$, Fig. 1.

F, Fig. 2, is a spring that bears on the hand or click, and keeps it constantly on the rag-wheel, the place where it is fastened is also represented at $n$, Fig. 1.

P, is an iron hasp, or, clasp, bent in an angle; one end has a hole through it, which is placed over the end of the rag wheel shaft to keep the crooked lever I, in its place; the other end is held down on the upper side of the piece of timber C, by means of an iron pin as represented at P, Fig. 1.

The figures 1, 2, 3, 4, and 6, represent guide blocks; they are between three and four inches wide, and about nine inches long and two inches thick. On the upper side and along the outer edge is fastened a plate of iron, as represented by the dark shades on the blocks; these blocks are screwed down near one end, on a two inch plank which is fastened to the sleepers of the saw mill; the front edges of the blocks are placed in a straight line (when not turned out by the wedges) with the center of the carriage; they are left sufficiently loose, to turn at the screw, for the purpose of having the wedges S, S, S, placed behind them, when required to be turned out, as represented at figures 1, 2, and 3, while figures 4 and 6, remain straight, having no wedges placed behind them.

T, represents a piece of timber two inches thick and about eight inches broad, which is pinned down on the plank on which the guide blocks are screwed. The end of this piece approaches the saw, to within about eighteen inches, and extends the other way, about one foot beyond the farthest guide block, whatever the number of guide blocks may be, and laps about one foot against the piece U, which may also be called a guide block; it is fastened down like the others, at the front end it is beveled to correspond with the other guide blocks, when they are turned out by the wedges S, S, S.

V, represents a wooden spring two inches in thickness, and of sufficient strength to give it proper elasticity, the end toward the back part of the saw mill, is cut to bevel to fit against the beveled side of the piece U, Fig. 1, as represented at $x$, and form a straight line with that side of the piece U; the other end is rabbeted out to afford the opportunity of screwing down to the floor, and extends far enough toward the saw to carry the lever Q, past all the guide blocks.

Y, is a wooden spring, fastened on the inside of the carriage beam; it has a staple fastened at the elastic end, into which is hooked the end of the iron rod $z$; the other end of the rod is hooked into a hole in the crooked lever Q, as represented in Fig. 1.

The operation of sawing, with a saw mill having these improvements, is similar to that of any other saw mill; after one cut of the log is finished however, and the carriage has returned between two and three feet from the saw, the lower end of the crooked lever Q, will come in contact with the front edge of the guide block next to the saw; which has been turned out previously, by placing a wedge of the proper thickness behind it; as represented by the blocks 1, 2, and 3. The lower end of the lever will then be diverted from the straight line in which it moved previous to coming into contact with the guide block; and will then pass along the edge of the block until it arrives at the end of it; during this progress of the lower end of the lever, the hand, or, click, being in the teeth of the rag wheel, will cause it to turn, in proportion, as the guide block is turned out by the wedge; this will also turn the small cog wheel, which is on the same shaft, and works in the teeth of the straight iron bar, that is fastened to the tail block, upon which the back end of the log is fastened, and consequently will shift the log. The carriage continuing to move back, and the lower end of the lever having arrived at the end of the guide block, it will be drawn back, by the wooden spring Y, which is connected with the lower end of the lever by the iron rod Z; into the same line from whence it was diverted by the guide block, and as it is represented in the drawing. The lever having been drawn back, will cause the hand or, click, to take another hold on the rag-wheel, which will move it again, whenever the lever will receive another motion. Every guide block that comes in contact with the lever will produce the same result: Any required thickness can therefore be sawed, by increasing the number of guide blocks, and the wedges placed behind them. The carriage, still continuing to return, until the lower end of the lever has passed all the guide blocks; it will then move along the beveled end of the piece of timber U, until it comes against the inside of the wooden spring V, which will yield to the lever and let it pass out at $x$, and move along the edge of the piece of timber U. As the carriage moves forward, during the operation of sawing, the lower end of the lever will move along the outside of the wooden spring V, until it arrives at the end of the spring: The other wooden spring Y, will then draw the lever against the inner edge of the piece of timber T, at 21, where it will again be brought into contact with the guide blocks as before. The rag wheel having the teeth one quarter of an inch apart, and the small cog-wheel being on the same shaft, and being one half the diameter, each tooth of the ragwheel, when in motion, will move the tail block, with the log, one eighth of an inch. The number of guide blocks, and the wedges will therefore be required to be so regulated as to cause the lever to move the rag-wheel, and consequently the tail block and log, so as to saw the timber the desired thickness.

The shaft of the ragwheel is made square, and projects about four inches beyond the hasp, or, clasp, that holds the crooked lever to its place, as represented in the drawing, for the purpose of putting a lever to it, to shift the log its entire thickness, by hand, for the purpose of taking off the slabs. The piece of timber T, is intended to support the guide blocks and wedges, and for the lower end of the lever to rest against, before it arrives at the guide blocks. The The iron plates on the upper side at the front edge of the guide blocks, is placed there, to prevent them from wearing so as to destroy their accuracy. The proportions above given, may be deviated from, to suit the fancy of the constructor; the rag-wheel may also be placed in a horizontal position, and the other parts connected with it, so arranged as to suit its operation; and yet all be so constructed as to work on the principles herein described and explained; if it should be desired, or preferred.

What I claim as my invention, and desire to secure by Letters Patent is:

Making the guide blocks in hinged sections, so as to set the log by several operations of the lever acting on the ratchet wheel; instead of one operation, in combination with the timbers T, and U, and the spring V, the guide blocks being regulated by wedges, or, other analogous device, all as herein described.

JOHN MILLER.

Witnesses:
P. B. FREDRICK,
ABRAHAM GASKILL.